E. D. MEIER.
Hydraulic Multiplier.

No. 228,771.  Patented June 15, 1880.

Attest:
Charles Pickles
John W. Herthel

Inventor:
Edward D. Meier
per Herthel & Co
his Attys

UNITED STATES PATENT OFFICE.

EDWARD D. MEIER, OF ST. LOUIS, MISSOURI.

HYDRAULIC MULTIPLIER.

SPECIFICATION forming part of Letters Patent No. 228,771, dated June 15, 1880.

Application filed June 13, 1879.

*To all whom it may concern:*

Be it known that I, EDWARD D. MEIER, of St. Louis, in the State of Missouri, have invented a new and useful Improved Hydraulic Multiplier, of which the following is a specification.

My invention relates to hydraulic multipliers, and is designed as an apparatus for augmenting the working pressure of water or other liquid or fluid from an accumulator, reservoir, pump, or motor to any apparatus, press, or machine that is to be actuated by said augmented pressure.

I will first fully describe the construction and operation of my hydraulic multiplier, and hereinafter point out the novel features thereof in the claim.

Figure 1:
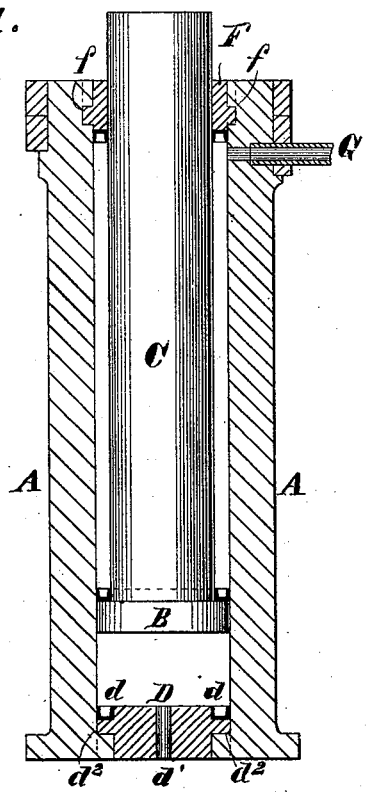
Figure 2:
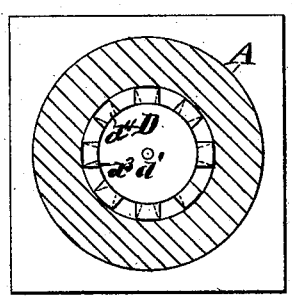

Of the drawings, Figure 1 represents a sectional elevation of my hydraulic multiplier. Fig. 2 is a plan section, showing construction of parts to seat and join the collar, plug, or gland to either end of the cylinder.

A is the cylinder, containing a plunger or piston, B, having a stem, C, of smaller diameter, whose cross-sectional area may be any desired part of the cross-sectional area of the plunger B. The lower end of the cylinder is closed by the plug D, having packing at $d$, and an opening at $d'$. (See Fig. 1.) Through the opening $d'$ the lower end of the cylinder communicates with the pipes that carry the water under pressure.

The plug D rests upon the shoulder $d^2$ of the cylinder. Further, to facilitate the removal and renewal of the packing or glands at both ends of the cylinder, the plug or lower gland, D, and the upper plug or gland, F, can be similarly joined to the respective cylinder ends as follows: The plug D has lugs or projections $d^3$, fitted to pass through openings $d^4$ (shown in dotted lines in Fig. 2) of the cylinder and be locked under the solid lugs or metal of the cylinder. The top gland, F, to close the upper end of the cylinder round the protruding stem, (see Fig. 1,) is likewise made to have lugs or projections $f$, fitted to pass through corresponding openings in the cylinder end and be locked under the solid metal of the cylinder. By simply reversing the turn imparted to the collar, plug, or gland D or F, these can be removed and the packing at these points examined and renewed.

A suitable key can be introduced into one or more of the openings $d^3$, or openings at the top end of the cylinder, to prevent the plugs D or F from turning and key same in place.

G is the pipe-connection to the apparatus, press, or other machine that is to be actuated by the augmented pressure.

The operation of my hydraulic multiplier is as follows: Water having first been admitted through pipe G into the upper portion of the cylinder A, its plunger (stem and piston) being down near the plug D, the water or liquid under pressure from the reservoir, accumulator, pump, or other main source is then admitted through the opening $d'$, forcing the plunger upward and discharging water or liquid through the pipe G into the press or machine to be actuated. Here it will be noted that the pressure on the unit of measure in that portion of the cylinder A surrounding the plunger or stem C, Fig. 1, will bear the same ratio to the pressure per unit (square inch) of measure under the plunger B that the cross-sectional area of the said plunger bears to the cross-section of the stem C, or to the area of the annulus between the stem C and cylinder A. The pressure per unit of measure is multiplied by this ratio. Therefore I call my machine a "hydraulic multiplier."

This machine or multiplier is so placed in the line of communication from the pump, reservoir, accumulator, &c., to the press or machine to be actuated that by first closing the valve communicating with the opening in D and opening a valve to the press or machine, the water or liquid from such pump, &c., may flow directly to the press or machine to be actuated, moving it until the resistance equals this direct pressure. The direct communication is then closed and the water or liquid under pressure admitted by a valve through the opening in D, so that the water or liquid surrounding the stem C may pass through the opening G with multiplied pressure into the press or machine to be actuated until the ultimate load is reached; or the multiplier may be used at once without opening any direct communication between the source of power and machine to be operated.

What I claim is—

The combination essentially consisting of the cylinder A, containing the plunger B, having stem C, the latter being of less diameter than the former, said cylinder being closed at its lower end by plug D, having inlet-port $d'$, the upper end of said cylinder being closed by a gland, F, through which the stem protrudes, the outlet port or pipe G communicating with the annular space between said cylinder and plunger-stem, all said parts forming the improved hydraulic multiplier, substantially as herein shown and described.

In testimony of said invention I have hereunto set my hand.

EDWARD D. MEIER.

Witnesses:
WILLIAM W. HERTHEL,
JOHN W. HERTHEL.